United States Patent
Canelones

(10) Patent No.: US 6,804,242 B1
(45) Date of Patent: Oct. 12, 2004

(54) METHOD AND APPARATUS FOR THE CHANNELIZATION OF CELL OR PACKET TRAFFIC OVER STANDARD PC BUSES

(75) Inventor: Orlando J. Canelones, Cedar Park, TX (US)

(73) Assignee: Advanced Mircro Devices, Inc., Austin, TX (US)

(*) Notice: Subject to any disclaimer, the term of this patent is extended or adjusted under 35 U.S.C. 154(b) by 0 days.

(21) Appl. No.: 09/407,504

(22) Filed: Sep. 28, 1999

(51) Int. Cl.[7] .............................................. H04L 12/56
(52) U.S. Cl. .............................. 370/395.1; 370/395.1; 370/419; 370/463; 370/474
(58) Field of Search ..................... 370/395.3, 395.31, 370/397, 395.1, 230, 237, 241.1, 463, 389, 231, 392, 236.1, 225, 400, 419, 420, 421

(56) References Cited

U.S. PATENT DOCUMENTS

| | | | |
|---|---|---|---|
| 5,528,763 A | 6/1996 | Serpanos | 395/250 |
| 5,583,863 A * | 12/1996 | Darr et al. | 370/397 |
| 5,946,312 A | 8/1999 | Suzuki | 370/395 |
| 5,999,518 A * | 12/1999 | Nattkemper et al. | 370/258 |
| 5,999,980 A * | 12/1999 | Tanaka et al. | 709/235 |
| 6,377,583 B1 * | 4/2002 | Lyles et al. | 370/412 |
| 6,449,252 B1 * | 9/2002 | Marsteiner | 370/230 |

FOREIGN PATENT DOCUMENTS

| | | |
|---|---|---|
| GB | 2303521 | 2/1997 |
| WO | WO 95/30318 | 11/1995 |

* cited by examiner

*Primary Examiner*—Seema S. Rao
*Assistant Examiner*—Inder Palmehra
(74) *Attorney, Agent, or Firm*—Williams, Morgan & Amerson

(57) ABSTRACT

A computer system includes an end system, a bus, a communications interface and a bus controller. The bus is coupled to the end system. The communications interface is coupled to the bus and includes a physical layer, a receive buffer, and a channel control unit. The physical layer is adapted to receive an input signal and demodulate the input signal to generate a plurality of cells. The receive buffer is adapted to receive the cells. The channel control unit is adapted to identify cells in the receive buffer associated with the virtual circuits. The bus controller is coupled to the bus and is adapted transfer at least the cells associated with the virtual circuits over the bus to the end system. A method for reducing traffic on a bus coupling an end system to an interface is provided. A plurality of virtual circuits are maintained in the end system. An input signal is received. The input signal is demodulated to generate a plurality of cells. Cells associated with the virtual circuits are identified. At least the cells associated with the virtual circuits are transferred over the bus to the end system after the cells have been identified as being associated with the virtual circuits.

24 Claims, 5 Drawing Sheets

METHOD AND APPARATUS FOR THE CHANNELIZATION OF CELL OR PACKET TRAFFIC OVER STANDARD PC BUSES

BACKGROUND OF THE INVENTION

1. Field of the Invention

This invention relates generally to communications systems and, more particularly, to a method and apparatus for the channelization of cell or packet traffic over standard pc-buses.

2. Description of the Related Art

Packet switching communications networks, such as asynchronous transfer mode (ATM) communication networks, are typically made up of a number of communication nodes coupled for communication over a set of high speed communication links. Such a communication network usually enables communication among a wide variety of communication devices, including video, voice, data and facsimile devices. The topology of such a communication network typically enables a variety of communication paths be established between any two communication nodes in the network. Such communication paths are generally referred to as a virtual circuit in the communication network. Typically, a physical path though the communication nodes for such a virtual circuit is established according to bandwidth utilization requirements for the virtual circuit and the available resources in the communication nodes and on the high speed communication links.

In an implementation where ATM is used in conjunction with a computer, the ATM communication functions are typically incorporated entirely in hardware in a network interface circuit. Hardware implementations are sometimes costly due to the number of specialized components required and the relative rigidity of the design. To reduce costs, industry groups have suggested implementing host-based software protocol stacks under the control of an operating system, such as the Windows® operating systems sold by Microsoft Corporation. A software solution is inherently more flexible than a hardware implementation, and also, due to the lesser number of hardware components, reduces cost. A software installation base is normally more easily maintained and upgraded than a similar hardware base.

A software implementation, however, has certain limitations. For instance, a hardware interface having limited-size transmit and receive queues (e.g., first-in-first-out buffers {FIFOs}) is still required. ATM information is transferred in 53 byte packets or cells. Each cell includes a 5-byte header and a 48-byte body. Because the operating system is not real-time, latencies could occur that result in the receive buffer reaching its storage capacity, a situation that is especially damaging during time-critical data streams, such as voice or video traffic. Such latencies could result in losing the ATM connection. Also, the received cells must be transferred from the hardware interface across a system bus, e.g., a peripheral component interconnect (PCI) bus, so that the cells can be processed by the software layer. Because, ATM protocols are often used for high-bandwidth applications, the amount of traffic on the bus may be appreciable. Increased bus traffic increases the overall latencies of the end system (i.e., the computer), which could compound the problem associated with the limited-size receive buffer. Increased system latency also decreases the efficiency at which other processes executing on the end system may complete.

The present invention is directed to overcoming, or at least reducing the effects of, one or more of the problems set forth above.

SUMMARY OF THE INVENTION

One aspect of the present invention is seen in a computer system including an end system, a bus, a communications interface, and a bus controller. The bus is coupled to the end system. The communications interface is coupled to the bus and includes a physical layer, a receive buffer, and a channel control unit. The physical layer is adapted to receive an input signal and demodulate the input signal to generate a plurality of cells. The receive buffer is adapted to receive the cells. The channel control unit is adapted to identify cells in the receive buffer associated with the virtual circuits. The bus controller is coupled to the bus and is adapted transfer at least the cells associated with the virtual circuits over the bus to the end system.

Another aspect of the present invention is seen in a method for reducing traffic on a bus coupling an end system to an interface. A plurality of virtual circuits are maintained in the end system. An input signal is received. The input signal is demodulated to generate a plurality of cells. Cells associated with the virtual circuits are identified. At least the cells associated with the viral circuits are transferred over the bus to the end system after the cells have been identified as being associated with the virtual circuits.

BRIEF DESCRIPTION OF THE DRAWINGS

The invention may be understood by reference to the following description taken in conjunction with the accompanying drawings, in which like reference numerals identify like elements, and in which.

Figure 1:
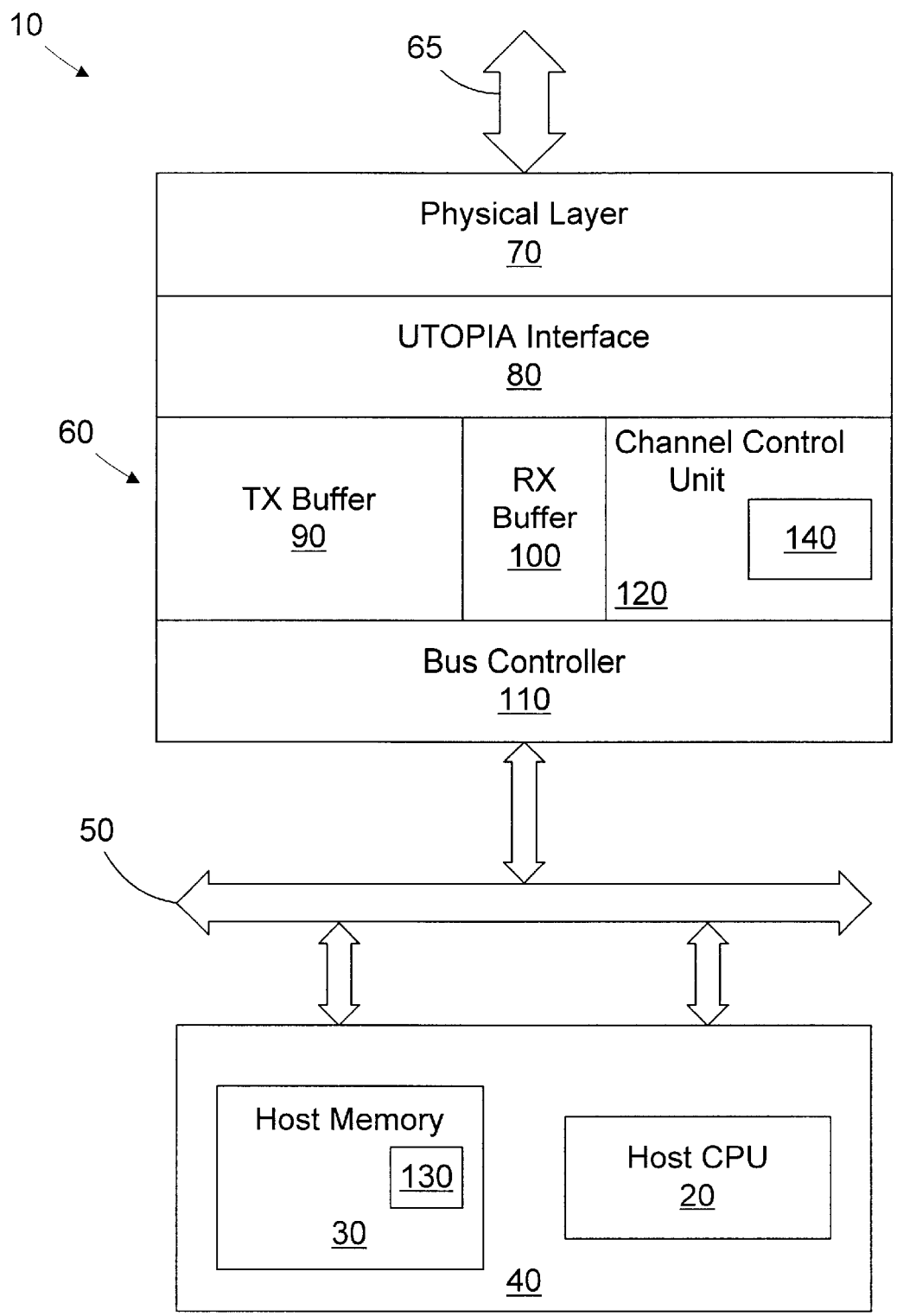
FIG. 1 is a simplified block diagram of a computer system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the FIG. 1, a simplified block diagram of a computer system 10 in accordance with the present invention is shown. To avoid unnecessarily obscuring the instant invention, not all components of a complete computer system are described. The computer system includes a host central processing unit (CPU) 20 and host memory 30, collectively referred to as an end system 40. The end system 40 operates under control of an operating system, such as a Windows® 98 or Windows® NT operating system sold by Microsoft Corporation. The end system 40 is coupled to a bus 50, such as a peripheral component interconnect (PCI) bus. A communications interface, such as a network interface circuit (NIC) 60 also interfaces with the bus 50 and provides an external interface for the computer system 10. Typically, the end system 40, bus 50 and NIC 60 are contained in a common housing (not shown).

The NIC 60 is adapted to communicate through an external communication link 65 to a larger communication network (not shown), such as a wide area network (WAN), local area network (LAN), telephone network, fiber optic network, wireless network, etc., using a transfer protocol. To facilitate understanding of the present invention, the operation of the computer system 10 is described as it may be implemented using an asynchronous transfer mode (ATM) protocol. Application of the invention, however, is not so limited, as other transfer protocols may be used. The ATM protocol is described in the B-ISDN ATM Layer Specification 1.361 by the ITU-C and the ATM User-Network Specification version 3.1 by the ATM Forum, among other numerous standards and industry publications. The ATM protocol functionality is provided by software operating under the control of the operating system of the end system 40.

The NIC 60 includes a physical layer (PHY) 70. The specific construct of the physical layer 70 depends on the nature of the external communication link 65. Various physical layer implementation requirements are defined in industry standards. Generally, the physical layer 70 modulates outgoing ATM cells for transmission over the external communication link 65 and demodulates incoming ATM cells from the signal received over the external communication link 65. A universal test and operations PHY interface for ATM (UTOPIA) data path interface 80 defines the interface between the physical payer 70 and upper layer modules such as the ATM layer and various other management entities. The UTOPIA interface 80 provides a common PHY interface in ATM subsystems across a wide range of speeds and media types. The industry standard requirements for the UTOPIA interface 80 are well known in the art, and are thus not described in greater detail herein.

The UTOPIA interface 80 communicates with a transmit (TX) buffer 90 and a receive (RX) buffer 100. In the illustrated embodiment, the TX and RX buffers 90, 100 are first-in-first-out (FIFO) buffers. The buffers 90, 100 interface with a bus controller 110, which coordinates transfer of the transmit and receive frames over the bus 50. A channel control unit 120 interfaces with the RX Buffer 100 to channelize incoming cells and remove extraneous cells, as described in greater detail below. The host CPU 20 stores the cells received from the bus controller 110 after being filtered by the channel control unit in a cell queue 130.

Figure 2:
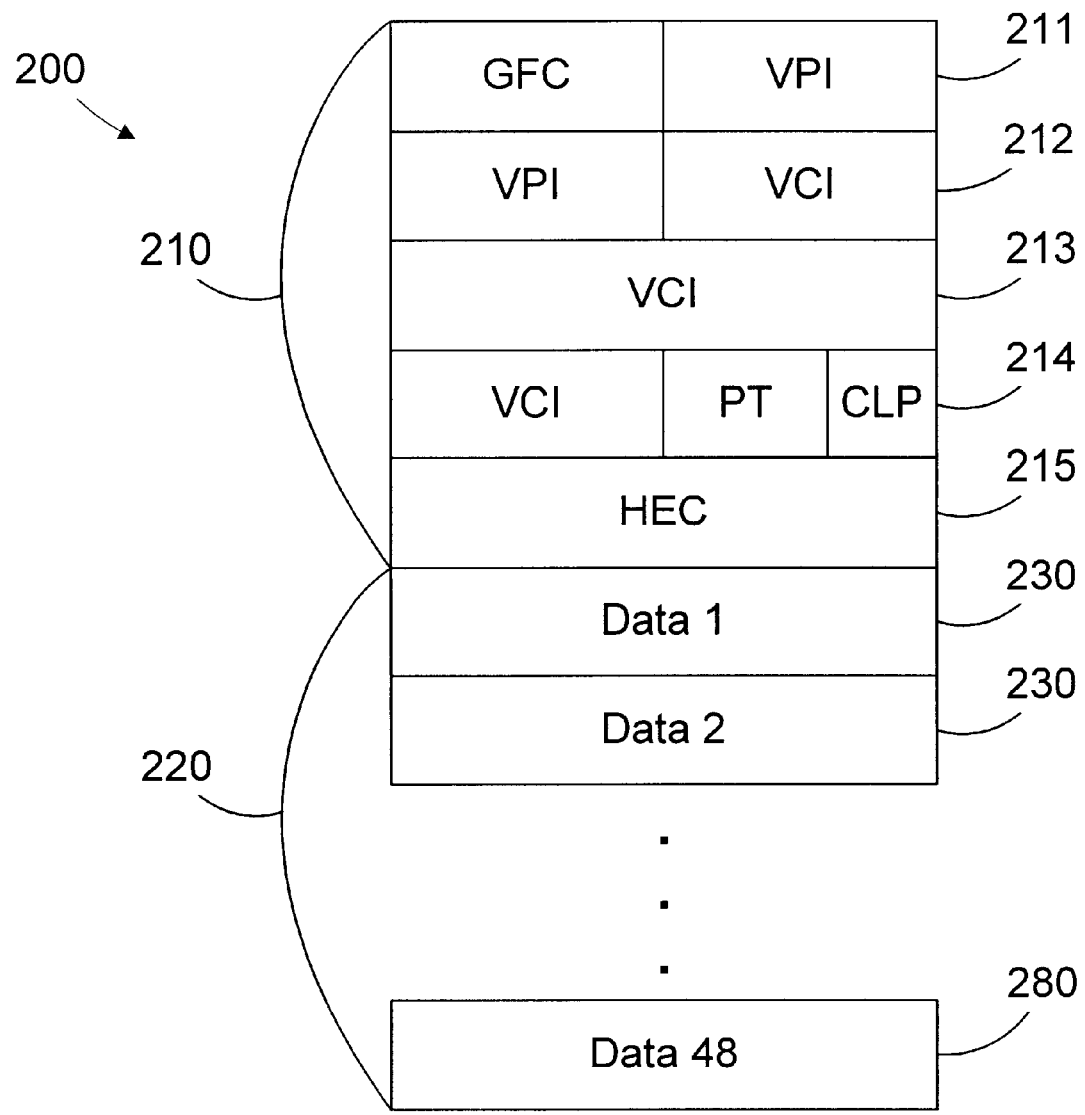
FIG. 2 is a diagram illustrating the construct of an ATM cell.

Turning now to FIG. 2, a diagram illustrating the construct of an ATM cell 200 is provided. The cell 200 includes a 5-byte header 210 (individual bytes 211, 212, 213, 214, 215) and a 48 byte-body 220. The first byte 211 in the header 210 includes a generic flow control field (GFC) (4-bits) used for physical access control. A virtual path identifier (VPI) (8-bits) is split between the first and second bytes 211, 212 (4—4). A virtual channel identifier (VCI) (16-bits) is contained in the second, third, and fourth bytes 212, 213, 214 (4-8-4). Together, the VPI and VCI define a virtual circuit (VC) in the end system 40. Unique VPI/VCI identifiers are assigned to indicate the type of cell that is following. These cell types are unassigned cells, physical layer OAM cells, metasignaling channel cells, and generic broadcast signaling channel cells. A payload type field (PT) (3-bits) and a cell loss priority (CLP) bit are also contained in the fourth byte 214. The PT field indicates the presence of user data, and the CLP bit indicates whether the cell 200 may be dropped during times of resource congestion (e.g., if CLP=1, the cell 200 may be dropped in favor of a cell with CLP=0). The fifth byte 215 includes a header error correction (HEC) field used as a cyclic redundancy check (CRC) checksum to sense and correct erroneous bits received in the header 210. Only one faulty bit may be repaired using the HEC field. The cell body 220 includes 48 user data bytes 230.

Returning to FIG. 1, the operation of the channel control unit 120 is described in greater detail. The channel control unit 120 is adapted to improve efficiency by channelizing the cells and removing extraneous cells. The channel control unit 120 may be implemented in a programmable microcontroller, dedicated control logic, or through some other programmable means.

Figure 3:
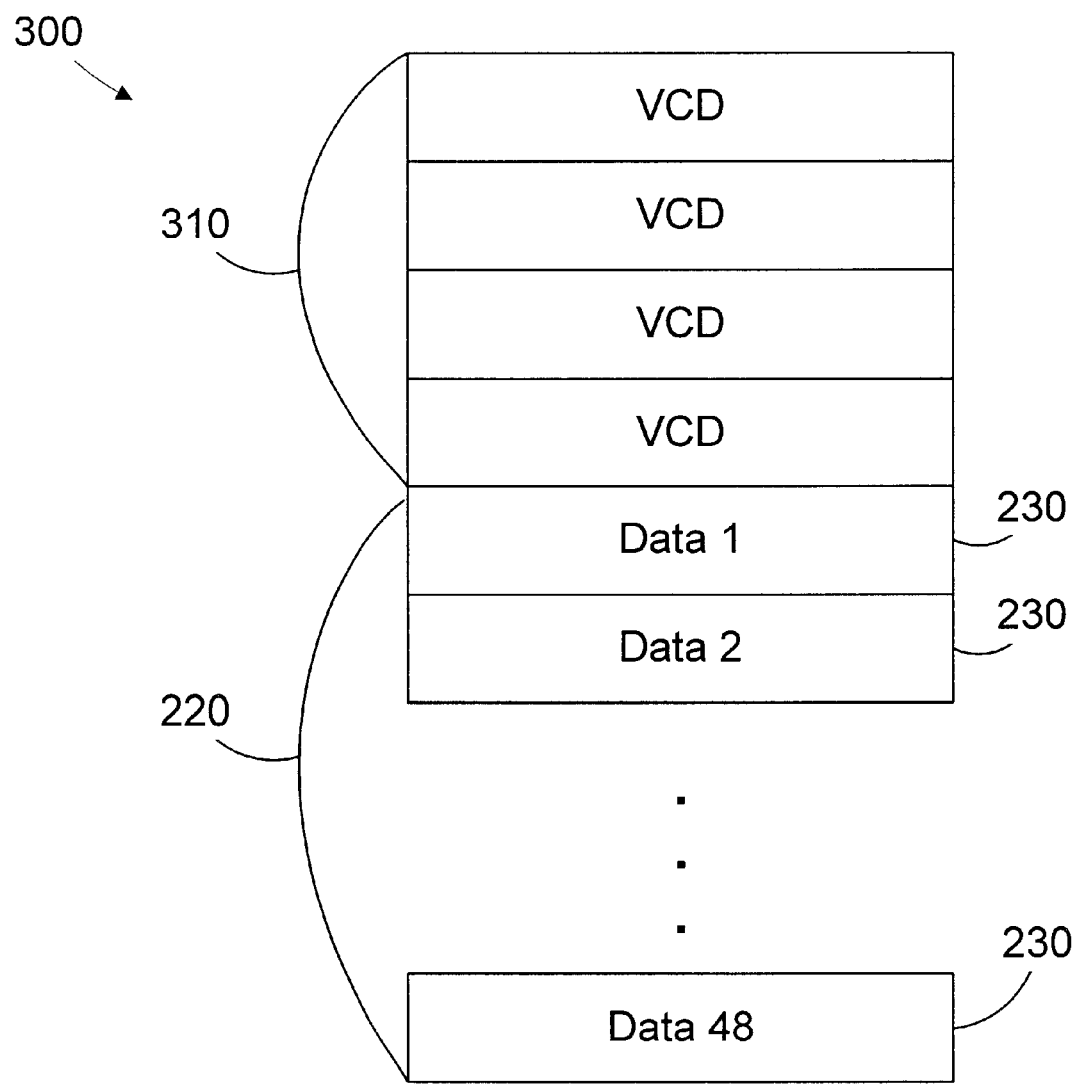
FIG. 3 is a diagram illustrating a channelized cell generated by the channel control unit of FIG. 1.

The channel control unit 120 maintains a VPI/VCI lookup table in an associative cache 140 for indexing VPI/VCI pairs with active virtual channels (VCs) in the end system 40. A successful lookup in the VPI/VCI lookup table yields a virtual channel descriptor (VCD) corresponding to one of the active VCs. The VCD may be thought of as an index number for one of the active VCs on the end system 40. The channel control unit 120 generates a channelized cell 300 (shown in FIG. 3) by replacing the 5-byte cell header 210, described above in reference to FIG. 2, with the VCD 310 (4-bytes). The size of the channelized cell 300 is thus reduced to 52 bytes. Due to this size reduction, the bus controller 110 is able to more efficiently transfer the channelized cell 300 over the bus 50 to the end system 40 (i.e., through 13 32-bit transfers). This reduces the latency associated with transferring the channelized cells 300 over the bus 50, thus increasing the overall speed and efficiency of the computer system 10. The channel control unit 120 may generate the channelized cell 300 by overwriting the header 210 of the cell 200 in the RX buffer 100 or, alternatively, the channel control unit 120 may insert the VCD 310 on the fly as the channelized cell 300 is transferred to the bus controller 110. In the illustrated embodiment, the insertion is performed by the channel control unit 120 on the fly.

Another advantage of the channelization performed by the channel control unit 120 is that it reduces processing and storage demands on the end system 40. Otherwise, the host CPU 20 would need to store the VPI/VCI lookup table in the host memory 30 and perform the channelization itself. Lowering the processing demands on the end system 40 also decreases the likelihood of an overflow condition in the RX buffer 100 due to latencies in the end system 40.

The channelization described above is partially defined by the particular ATM protocol used to illustrate the present invention. A different transport protocol may use a different technique to correlate cells to channels in the end system 40. Application of the channelization method described herein to such cells is contemplated and is within the scope of the present invention.

The channel control unit 120 also discards extraneous cells to reduce the number of cells 300 that pass over the bus 50 to the end system 40. Extraneous cell removal frees up space in the RX buffer 100 for needed user cells, thus further reducing the likelihood of an overflow condition. Also, because fewer cells are transferred over the bus 50, overall latency is reduced. The types of cells that may be discarded by the 120 are described below.

A first type of extraneous cell is a stray cell. A stay cell is defined as a cell having VPI/VCI fields that do not correspond to any current active virtual channels in the end system 40. Another type of extraneous cell is an erroneous cell. Erroneous cells result from bit errors in the transmission media having caused the cell header 210 to have been corrupted beyond repair (i.e., more than one bit is erroneous as determined by the HEC field). The correction of the header 210 is performed if possible by the physical layer 70. Stray and erroneous cells are identified by a miss in the VPI/VCI lookup table. In the illustrated embodiment, the channel control unit 120 is configurable to enable or disable the discard function for at least a portion of the stray and erroneous cells.

A third type of extraneous cell is an unassigned cell. Unassigned cells are visible to both the physical layer 70 and the ATM layer and may be used for flow control purposes. These cells have VPI=0 and VCI=0. In the illustrated embodiment, the channel control unit 120 always discards all unassigned cells.

A fourth type of extraneous cell is referred to as an optional cell. Per certain PC standards, such as those proffered by Microsoft Corporation, end PC systems may not be required to support the flow of certain types of operations, administration and maintenance (OAM) cells. These cells are visible at the ATM layer and would be eventually be discarded by the protocol stack on the end system 40 if the vendor of the end system 40 has opted not to support them. The channel control unit 120 can be instructed in such cases to discard such cells. Exemplary optional OAM cells are F4 and F5 cells. The F4 flow cell is used for segment or end-to-end management of the virtual path level. F4 flow cells are distinguished by their VCI/VPI values in that the VCI value is 3 (i.e., 0000 0011 binary) and the VPI is the same as the user. An end-to-end F4 flow cell has a VCI value of 4 (i.e., 0000 0100 binary) with the VPI again the same as the user. An OAM F5 flow cell is used for segment or end-to-end management of the virtual channel level. These cells are distinguished by a specific PT value of 4 (i.e., 100) for segment and 5 (i.e., 101) for end-to-end F5 flow cells. The F5 flow cells contain both the same VCI and VPI as the user. In the illustrated embodiment, the channel control unit 120 is configurable to enable or disable the discard function for optional cells, such as the OAM cells.

The types of extraneous cells described above are partially defined by the particular ATM protocol used to illustrate the present invention. A different transport protocol may have different specific extraneous cells. Application of the discard method described herein to such cells is contemplated and is within the scope of the present invention.

Figure 4:
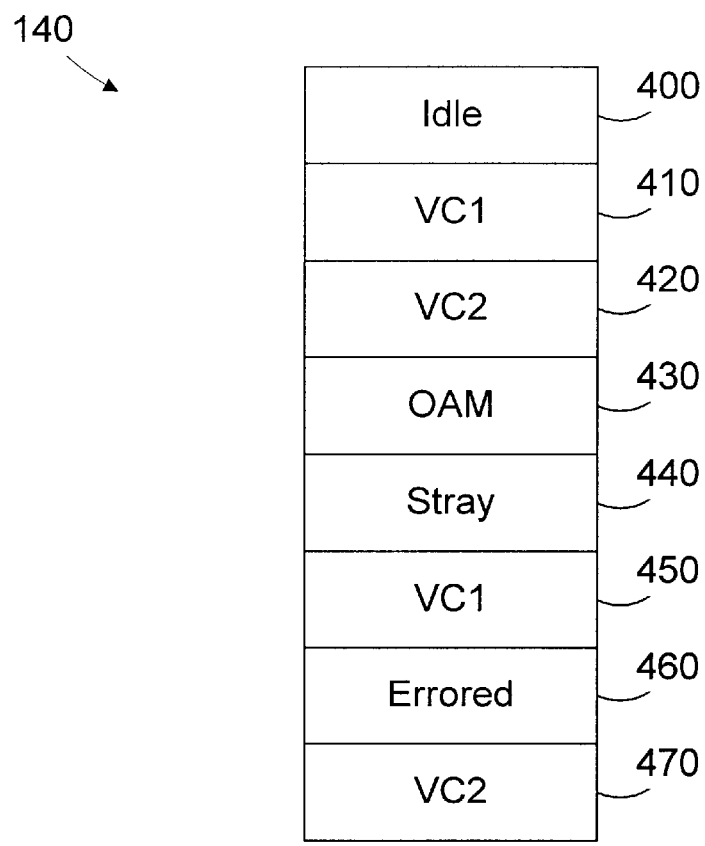
FIG. 4 is a diagram illustrating the contents of the receive buffer of FIG. 1 during an exemplary data stream.
Figure 5:
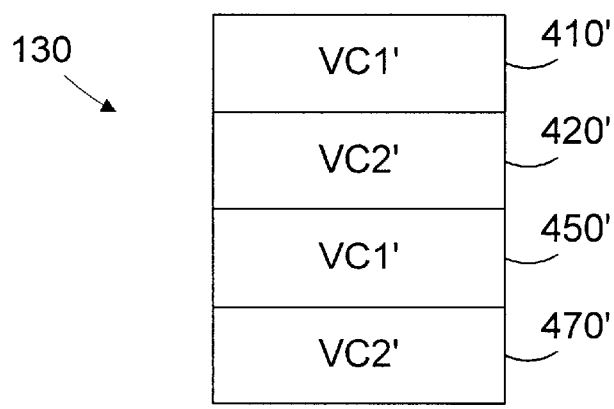
FIG. 5 is a diagram illustrating the contents of a cell queue in the host memory of FIG. 1 after extraneous cells have been removed by the channel control unit.

Turning now to FIGS. 4 and 5, diagrams of the contents of the RX buffer 100 and the cell queue 130 during an illustrative data stream are shown, respectively. The data stream includes an unassigned cell 400, followed by VC1 and VC2 data cells 410, 420, respectively. Next an OAM cell 430 and a stray cell 440 are received, followed by a VCI cell 450, an erroneous cell 460, and a VC2 cell 470. The channel control unit 120 discards the unassigned cell 400 and the OAM cell 430 based on the information contained in the cell header 210, as described above. The channel control unit 120 discards the stray cell 440 and the erroneous cell 460 based on misses in the VPI/VCI lookup table stored in the associative cache 140.

The channel control unit 120 uses the information in the VPI/VCI lookup table to determine the active channels associated with the VCI and VC2 cells 410, 420, 450, 470 and to replace the cell header 210 with the shortened VCD 310 (shown in FIG. 3) to generate channelized cells 410', 420', 450', 470' in the cell queue 130 shown in FIG. 5.

As illustrated above in reference to FIGS. 4 and 5, discarding the extraneous cells reduces the number of cells to be transferred over the bus 50 from eight to four, thus decreasing the bus latency associated with supporting the ATM function. Also, channelizing the cells 410', 420', 450', 470' reduces processing load on the host CPU 20 and further decreases bus latency by providing more efficiently-sized cells for transfer.

Figure 6:
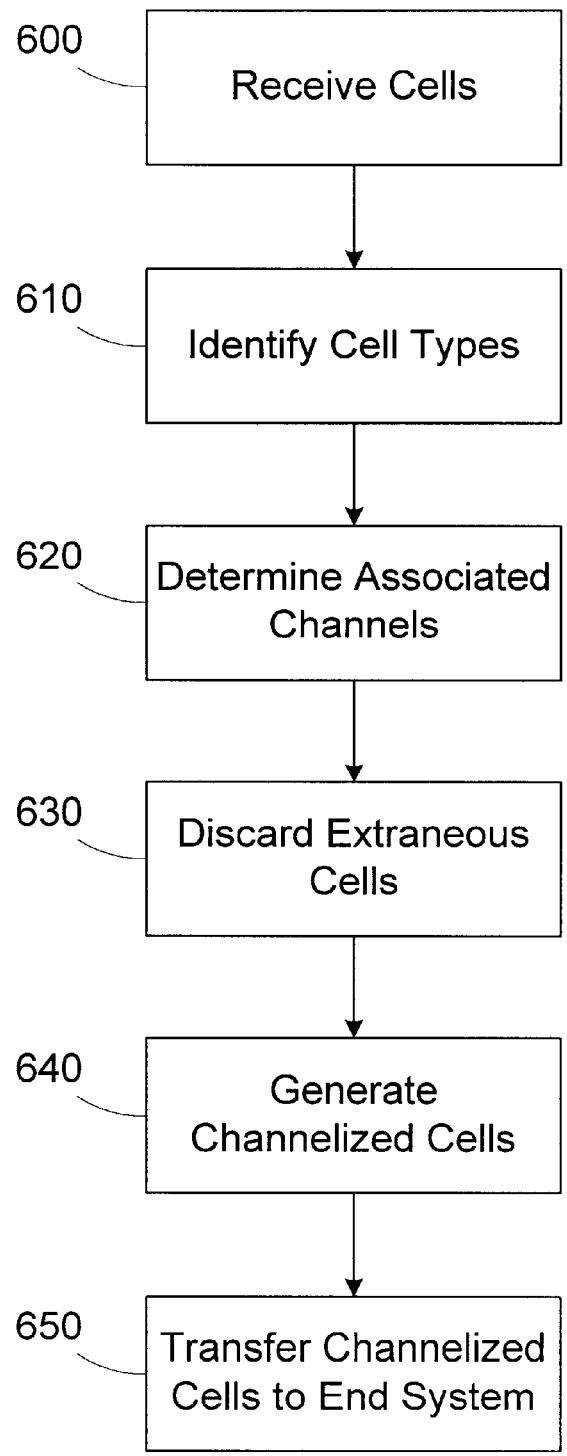
FIG. 6 is a flow diagram of a method for reducing ATM bus traffic in accordance with the present invention.

Turning now to FIG. 6, a flow diagram of a method for reducing ATM bus traffic is provided. Cells are received in block 600. The cell types (e.g., data, optional, unassigned) are identified in block 610 and the associated channels (e.g., VCx, erroneous) are determined in block 620. The extraneous cells (e.g., optional, unassigned, stray) are discarded in block 630, and channelized cells are generated in block 640 based on information obtained during the associated channel determination of block 620. Finally, the channelized cells are transferred to the end system 40 (i.e., over the bus 50) in block 650.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer system, comprising:
   an end system adapted to maintain a plurality of virtual circuits;
   a bus coupled to the end system;
   a communications interface coupled to the bus, the communications interface comprising:
   a physical layer adapted to receive an input signal and demodulate the input signal to generate a plurality of cells;
   a receive buffer adapted to receive the cells;
   a channel control unit adapted to identify cells in the receive buffer associated with the virtual circuits; and
   a bus controller coupled to the bus and adapted to transfer at least the cells associated with the virtual circuits over the bus to the end system and discard at least a portion of the cells associated with virtual circuits other than those maintained by the end system.

2. The computer system of claim 1, wherein the end system includes a host memory adapted to receive the cells associated with the virtual circuits from the bus interface.

3. The computer system of claim 1, wherein each cell includes a header, and the channel control unit is adapted to determine if a particular cell corresponds to a particular virtual circuit based on the header.

4. The computer system of claim 3, wherein the header includes a cell identifier, the channel control unit is adapted to maintain an index table having virtual circuit descriptors linking the virtual circuits to associated cell identifiers.

5. The computer system of claim 4, wherein the channel control unit is further adapted to discard at least a portion of the cells not indexed in the index table.

6. The computer system of claim 4, wherein the cell identifier includes at least one of a virtual path identifier and a virtual channel identifier.

7. The computer system of claim 4, wherein the communications interface further includes an associative cache adapted to store the index table.

8. The computer system of claim 1, wherein the channel control unit comprises a programmable microcontroller.

9. The computer system of claim 4, wherein the channel control unit is adapted to generate channelized cells by replacing the header of the cells corresponding to the virtual circuits with the virtual circuit descriptor.

10. The computer system of claim 9, wherein the bus interface is adapted to transfer at least the channelized cells over the bus to the end system.

11. The computer system of claim 9, wherein the length of the virtual circuit descriptor is less than the length of the header.

12. The computer system of claim 9, wherein each channelized cell has a length of 52 bytes.

13. A method for reducing traffic on a bus coupling an end system to an interface, comprising:
    maintaining a plurality of virtual circuits in the end system;
    receiving an input signal;
    demodulating the input signal to generate a plurality of cells;
    identifying cells associated with the virtual circuits;
    transferring at least the cells associated with the virtual circuits over the bus to the end system after the cells have been identified as being associated with the virtual circuits; and
    discarding at least a portion of the cells associated with virtual circuits other than those maintained by the end system prior to transferring them over the bus.

14. The method of claim 13, wherein the end system includes a host memory, and the method further comprises storing the cells associated with the virtual circuits in the host memory.

15. The method of claim 13, wherein each cell includes a header, and the method further comprises determining if a particular cell corresponds to a particular virtual circuit based on the header.

16. The method of claim 15, wherein the header includes a cell identifier, the method further comprises maintaining an index table having virtual circuit descriptors linking the virtual circuits to associated cell identifiers.

17. The method of claim 16, further comprising discarding at least a portion of the cells not indexed in the index table.

18. The method of claim 16, wherein the cell identifier includes at least one of a virtual path identifier and a virtual channel identifier.

19. The method of claim 16, wherein maintaining the index table includes storing the index table in an associative cache.

20. The method of claim 16, further comprising replacing the header of the cells corresponding to the virtual circuits with the virtual circuit descriptor to generate channelized cells.

21. The method of claim 20, further comprising transferring the channelized cells over the bus to the end system.

22. The method of claim 20, wherein replacing the header of the cells corresponding to the virtual circuits with the virtual circuit descriptor includes replacing the header with the virtual circuit descriptor, the length of the virtual circuit descriptor being less than the length of the header.

23. The method of claim 20, wherein generating the channelized cells includes generating the channelized cells each having a length of 52 bytes.

24. A computer system for reducing traffic on a bus coupling an end system to an interface, comprising:
    means for maintaining a plurality of virtual circuits in the end system;
    means far receiving an input signal;
    means for demodulating the input signal to generate a plurality of cells;
    means for identifying cells associated with the virtual circuits;
    means for transferring at least the cells associated with the virtual circuits over the bus to the end system after the cells have been identified as being associated with the virtual circuits; and
    means for discarding at least a portion of the cells associated with virtual circuits other than those maintained by the end system prior to transferring them over the bus.

* * * * *